United States Patent
Lin et al.

(10) Patent No.: US 7,277,278 B2
(45) Date of Patent: Oct. 2, 2007

(54) HINGED PANEL AND DISC DRIVE FOR A COMPUTER

(75) Inventors: Pei-Shi Lin, Taipei Hsien (TW); David Hwang, San Marino, CA (US)

(73) Assignee: Thermaltake Inc., City of Industry, CA (US)

(*) Notice: Subject to any disclaimer, the term of this patent is extended or adjusted under 35 U.S.C. 154(b) by 189 days.

(21) Appl. No.: 10/963,844

(22) Filed: Oct. 12, 2004

(65) Prior Publication Data

US 2006/0077631 A1   Apr. 13, 2006

(51) Int. Cl.
*G06F 1/16*   (2006.01)

(52) U.S. Cl. ........................ 361/685; 681/683

(58) Field of Classification Search ......... 361/683–685
See application file for complete search history.

(56) References Cited

U.S. PATENT DOCUMENTS

| | | | |
|---|---|---|---|
| 4,797,865 A | 1/1989 | Imai et al. | 369/39 |
| 5,051,868 A * | 9/1991 | Leverault et al. | 361/683 |
| 5,299,182 A | 3/1994 | Sakiyama | 369/36 |
| D349,108 S | 7/1994 | Chang et al. | D14/115 |
| 5,384,760 A | 1/1995 | Kumakura | 369/38 |
| 5,631,882 A | 5/1997 | Mascenik | 369/30 |
| 5,633,842 A | 5/1997 | Nishida et al. | 369/32 |
| 5,751,672 A | 5/1998 | Yankowski | 369/30 |
| 5,771,213 A | 6/1998 | Koshino et al. | 369/37 |
| 5,898,650 A | 4/1999 | Porsbo et al. | 369/39 |
| 5,903,538 A | 5/1999 | Fujita et al. | 369/178 |
| 5,914,918 A | 6/1999 | Lee et al. | 369/34 |
| 5,974,008 A | 10/1999 | Lee | 369/33 |
| 6,130,744 A | 10/2000 | Abe et al. | 356/73 |
| D445,773 S | 7/2001 | Fenner | D14/156 |
| 6,356,971 B1 | 3/2002 | Katz et al. | 710/301 |
| 6,388,958 B1 | 5/2002 | Yankowski | 369/30.06 |
| 6,392,875 B1 * | 5/2002 | Erickson et al. | 361/683 |
| 6,618,332 B2 | 9/2003 | Ochi | 369/30.79 |
| 6,667,879 B2 | 12/2003 | Salinas et al. | 361/685 |
| 6,682,110 B1 | 1/2004 | Arbogast et al. | 292/341.15 |
| 2003/0043702 A1 | 3/2003 | Lee et al. | 369/30.24 |
| 2004/0252594 A1 * | 12/2004 | Jewkes | 369/30.17 |

* cited by examiner

*Primary Examiner*—Yean-Hsi Chang
(74) *Attorney, Agent, or Firm*—Michael Fedrick; Sheldon Mak; Rose & Anderson (57) ABSTRACT

A panel hingedly connected to the body of a computer that includes an optical disc drive in electrical communication with the computer is provided.

24 Claims, 9 Drawing Sheets

HINGED PANEL AND DISC DRIVE FOR A COMPUTER

This application claims priority from U.S. patent application Ser. No. 29/210,333, filed Jul. 30, 2004.

BACKGROUND

Conventional desktop computers are designed with slots or bays to accommodate various internal components of a computer system, such as a circuit board, media drives, power supply, fan, and various ports for connecting the desktop unit to peripheral devices. Access to such internal components, in particular to media drives, is generally provided in a front face of the computer system accessible to a user. The front face may also include a power-on button, ports for connecting peripheral devices, and/or fan vents.

In tower-type desktop systems, the front face is generally greater in height than in width, and slots are typically arranged vertically from top to bottom. Only a limited number of slots accessible from the front face of the computer can be provided in such systems, however, if they are to retain an appropriate size for use in home and office environments.

While various computer components, such as media drives, can be made accessible by providing them as separate units housed outside of a desktop computer, it is desirable to place such components in the housing of a desktop system in order to better protect such components, reduce the number of external wires attached to the computer, and provide a more compact computer system.

SUMMARY

Because of the limited amount of space available for electronic components in a computer housing, there remains a need for computer systems which efficiently utilize the space available for such components while allowing user access to certain system components. The present computer system meets this need by providing a panel which is hingedly connected to the body of a computer and which retains a disc drive in electrical communication with the computer. The present system thereby provides space for one or more disc drives for a computer system without occupying one of the slots of the computer system chassis, thus leaving the slot available for additional computer components or allowing it to be eliminated altogether in order to decrease the width or height of the computer housing.

In one embodiment, the present invention comprises a panel adapted to be hingedly connected to a desktop computer, wherein the panel can cover at least a portion of a face of the computer. More preferably the panel can completely cover a face of a computer, in particular the front face of the computer. This panel is further adapted to retain a disc drive in electrical communication with the computer. Preferably, the panel includes a disc drive secured to the panel, in particular a drive that is reversibly secured to the panel. The disc drive is preferably an optical disc drive, and the panel can comprise a housing for the optical disc drive. The housing in this case includes an opening for inserting an optical disc into the disc drive, and in one embodiment comprises a tray that extends through the opening of the housing. In a particular embodiment, the optical disc drive retains an optical disc on a support surface on the front face of the panel. The panel further preferably includes a cover, which can be transparent, for the optical disc drive. The panel can further include a storage compartment, such as for storing optical discs.

In another embodiment, the present invention comprises a computer that includes (a) a computer housing having a face for providing access to computer components; (b) a panel hingedly connected to the computer, where the panel is adapted to retain an optical disc drive and to cover at least a portion of the face of the computer housing; and (c) an optical disc drive secured to the panel and in electrical communication with the computer. The rear face of the panel preferably completely covers the front face of the computer housing. The optical disc drive is preferably reversibly secured to the panel, and the panel also preferably comprises a housing for the optical disc drive. In this case, the housing includes an opening for inserting an optical disc into the disc drive, and the disc drive can include a tray that extends through the opening of the housing. A second optical disc drive and/or a storage compartment can also be secured to the panel. The optical disc drive can in some embodiments retain an optical disc on a support surface on the front face of the panel. Preferably, the panel further includes a cover, which can be transparent, over the optical disc drive. The cover can be hingedly or fixedly connected to the panel or to the disc drive. The computer can further include a lock for securing the panel over the face of the computer housing.

DRAWINGS

These and other features, aspects and advantages of the present invention will become better understood with regard to the following description, appended claims, and accompanying figures where:

All dimensions specified in this disclosure are by way of example only and are not intended to be limiting. Further, the proportions shown in these figures are not necessarily to scale. As will be understood by those with skill in the art with reference to this disclosure, the actual dimensions of any device or part of a device disclosed in this disclosure will be determined by their intended use.

DETAILED DESCRIPTION

Definitions

As used herein, the terms below have the following meanings.

"Bezel" means a covering or panel that extends over a face of a computer housing or over a portion thereof. A bezel can comprise a separate structure or piece of material from the remainder of a computer housing. A bezel can also be either fixedly secured to a computer or movably secured, such as with a hinge.

"Body," with reference to a computer, means the chassis and housing of the computer, including components secured to or enclosed by the chassis and/or the housing.

"Chassis" means the physical framework of a computer that supports and/or retains various components of the computer system, such as a circuit board, adapter cards, media drives, and power supply.

"Component" means a functional element of a computer system that is used in combination with other components of the system. Examples include circuit boards, media drives, the power supply, fans, and various ports for receiving cables for connecting a desktop unit to peripheral devices. A components that is "retained," "secured," or "attached" by or to a structural member (such as a housing, chassis, or panel) is connected to the structural member and fixed in position with respect to such structural member. Such retaining, securing or attachment can be accomplished by any means known to the art, including through chemical bonding, metallurgical bonding (e.g., welding), or mechanical attachment (e.g., screws, clips or other fasteners).

"Disc drive" and "drive" refer to a device that reads data from and/or writes data onto an information storage medium. "Optical disc drive" means a drive that is capable of reading data from optical media and/or of writing data onto such media. Such drives can, for example, be of the read-only type for use in accessing data from video discs (e.g. DVD's), compact discs (CD's), and the like. More preferably, disc drives used in the present system are able to access data from rewriteable discs, read-after-write type discs, DVD-RAM discs, and other optical media adapted to contain information accessible with an optical head. Preferably, such drives are also capable of writing information onto appropriate optical media such as CD-R, CD-RW, and DVD-RW discs.

"Face" means a surface forming part of the outside of an object. With reference to a computer housing, the front face of the housing can be a bezel. The front face can alternatively comprise an outer surface of a component of the computer system, such as the outer surface of a disc drive. In some embodiments, a portion of the surface of the front face can be empty, such as when a component of the computer has been removed from a bay of the computer chassis.

"Hinge" means a jointed or flexible structure or device on which a structural component, such as a door or panel, pivots or turns. "Hingedly connected" refers to the direct or indirect joining of two components by a hinge.

"Housing" means a protective cover designed to contain or support a mechanical and/or electrical component. A "disc drive housing" means a housing for containing a disc drive, while a "computer housing" means a housing for a computer chassis and for other computer components which are supported or retained by a computer chassis and/or by the computer housing. A bezel, when used, forms a part of a computer housing.

"Panel" means a rigid member having a front face and a rear face that forms a structural component of the present computer system. A panel can comprise a single sheet of material onto which, e.g., a disc drive can be secured. In an alternative embodiment, a panel can comprise a housing in which the front face and rear face of the panel are formed by different pieces of material or by different portions of a piece of material.

Computer System

The computer system 1 of the present invention comprises a computer body 5, a panel for retaining a disc drive 100, and one or more optical disc drives 130. The computer body 5 comprises a computer housing 10 that includes a front face 12 which provides access to one or more component bays 14 in the chassis. The component bays 14 are adapted to retain various computer components. The front face 12 also typically includes a power-on button. Preferably, the front face 12 or at least a portion thereof is substantially planar, and is also substantially perpendicular to a desktop, floor, or other surface on which the computer system 1 is supported.

Figure 5:
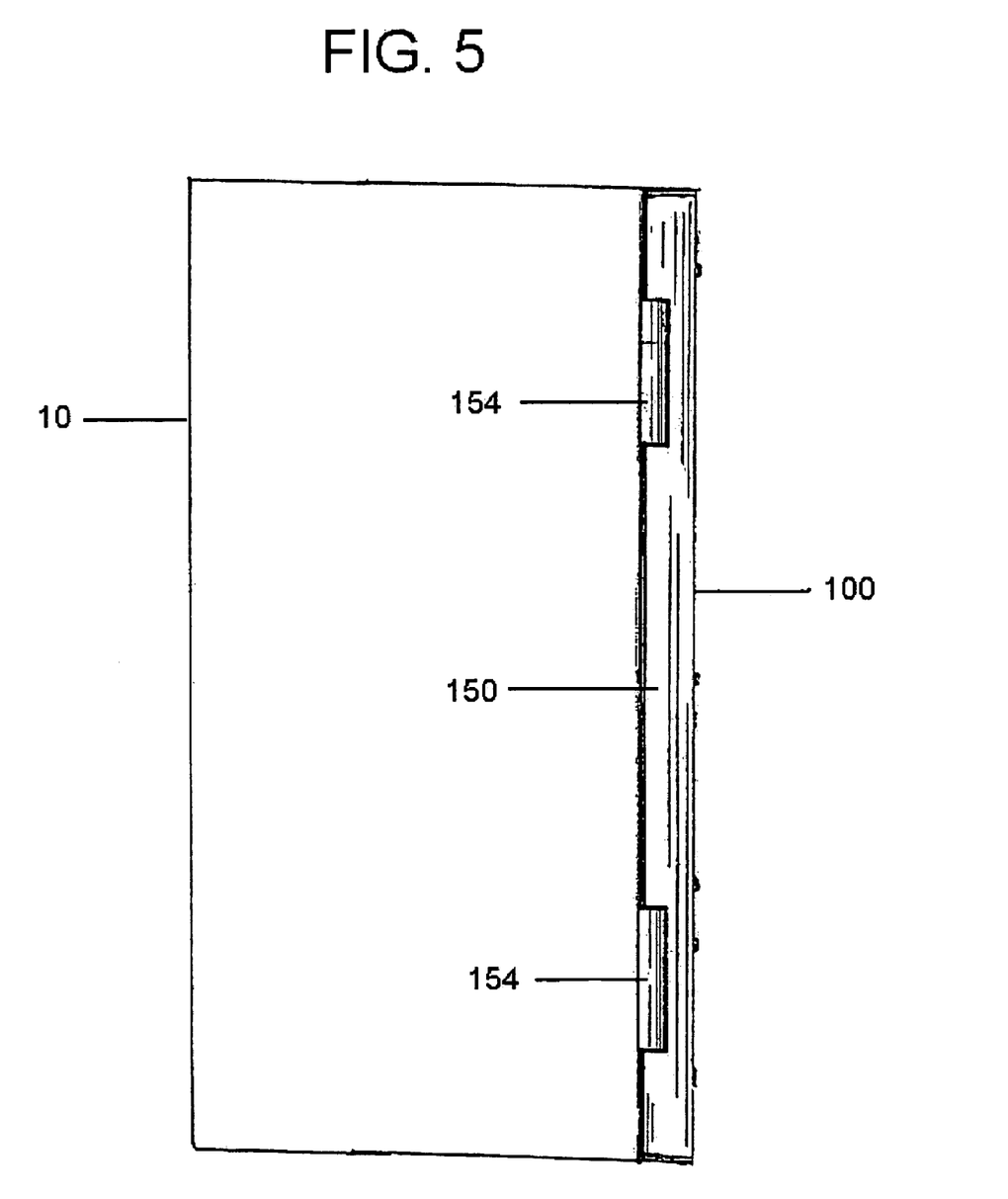
FIG. 5 is a left side plan view of an embodiment of the present invention.

The front face 12 of the computer housing 10 can be at least partially covered by the panel 100, which is connected to the body 5 of the computer system 1 by means of a hinge 154 (shown in FIG. 5). In a preferred embodiment, the panel 100 can completely cover the front face 12 of the computer housing 10. The panel 100 covers the front face 12 of the computer housing 10 when it is in a closed position, i.e. when the panel 100 is rotated about the hinge 154 so that a rear face 106 (shown in FIG. 6) of the panel 100 abuts the front face 12 of the computer housing 10. In this position, an optical disc drive retained by the panel 100 is preferably positioned so as to retain an optical disc in a plane substantially parallel to the front face 12 of the computer housing 10 and/or to the front face 104 of the panel 100. As used herein, "substantially parallel" means at an angle of less than 45°, more preferably at an angle less than 15°, and even more preferably at an angle of less than 5° with respect to another surface. "Substantially parallel" also includes a configuration that is parallel to another surface.

The hinge can connect the panel 100 to the body 5 of the computer system 1 directly or indirectly, such as via attachment panel 150. The hinge can be connected to the chassis of the computer system, to a bezel, to another portion of the computer body 5, or in any other way known to the art. The front face 12 of a desktop computer is typically rectangular in configuration, and the hinge or hinges 154 can be connected along one of either the shorter or longer sides of the front face 12 of the computer. In tower-type desktop systems, hinge or hinges 154 are preferably connected along one of the longer sides of the front face 12, i.e. one of the sides extending upward (away from) a support surface such as a floor or desktop. In such systems, the panel 100 swings on a hinge 154 away from the front face 12 like a door.

The panel 100 preferably includes a housing for a disc drive 130 retained by the panel 100. In a preferred embodiment, the rear face 106 of the panel 100 is a face of such housing. Disc drives 130 retained by the panel 100 are in electrical communication with other components of the computer system 1, such as via ribbon cable 142 or other wires. Preferably, such wires exit the rear face 106 of the panel 100 and enter the computer housing 10 through its front face 12. In this way the panel 100 covers such wires when the housing 100 is in a closed position. Power, data, and other electrical signals are transmitted between the components of the panel 100 and of the body 5 of the computer system 1, though data communication can also be wireless.

The panel 100 can include on its face light emitting diodes ("LED's") or other indicators for providing information about the operation of the computer, such as whether it is on or in "sleep" mode, or about the operation of the disc drive.

In addition, the panel 100 can be provided with a locking mechanism adapted to engage the chassis or computer housing 10 of the computer system 1 and thereby restrict access to drive bays 14, a power-on button, or other components accessible from the front face 12 of the computer housing 10.

The panel 100 is adapted to contain one or more disc drives 130, which are preferably optical disc drives. Optical disc drives known to the art can be used with the panel 100. Such disc drives include a support surface for retaining an optical disc and can comprise, for example, a tray or other generally flat surface for supporting a disc 50 and/or a center hub 133 for retaining the disc 50. Such a hub 133 is advantageous when the disc drive is not in a plane generally parallel to that of the floor or other support surface for the computer system 1 when the computer system 1 is in use. In order to retain a disc 50 on the support surface of the disc drive with a hub 133, the central hole formed in standard optical discs (such as CD's and DVD's) is pressed against sloped or rounded surfaces of the hub 133, which can comprise ball bearings. The surfaces move inwardly (toward the center of the central hole of the disc 50) as the disc 50 is pressed against the hub 133 until the disc passes the widest point of such surfaces, after which the surfaces move outwardly over the center hole of the disc 50.

Figure 1:
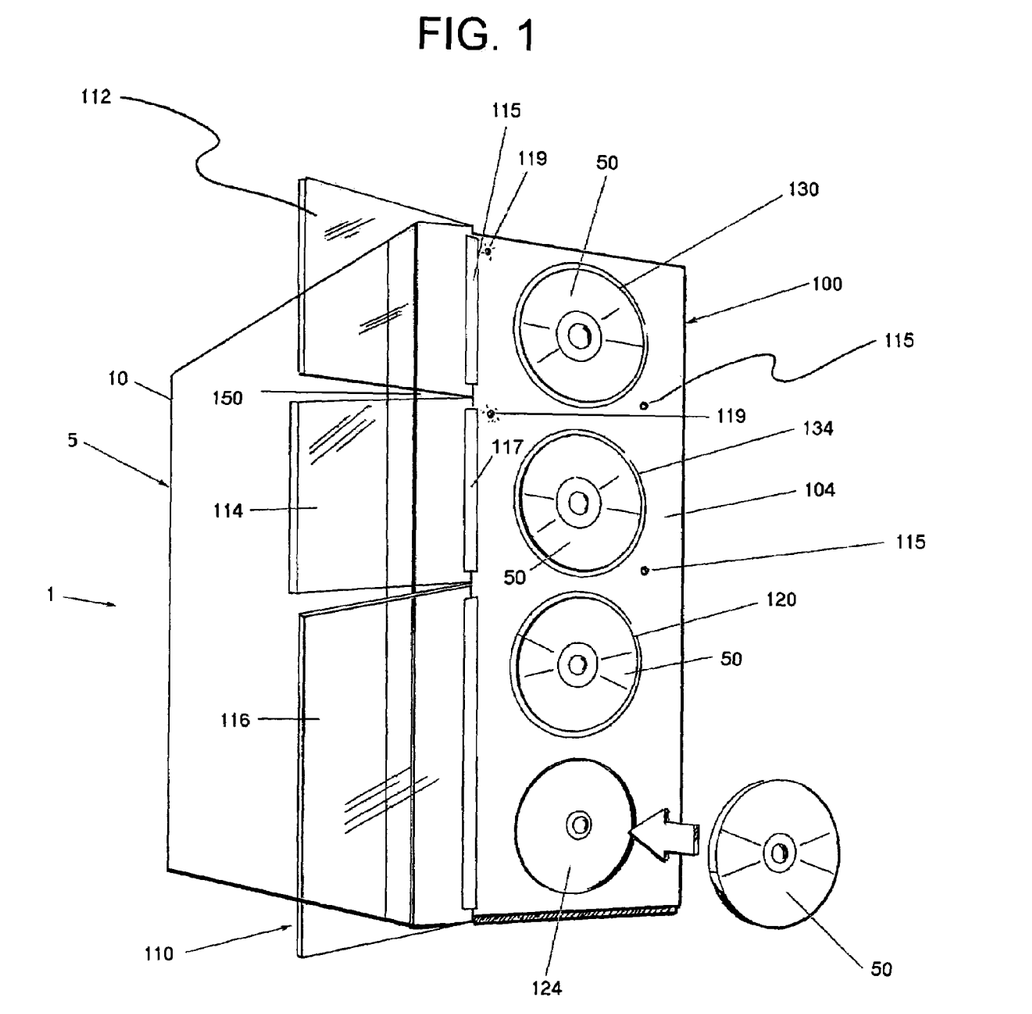
FIG. 1 is a left perspective view of one embodiment of the present invention.
Figure 2:
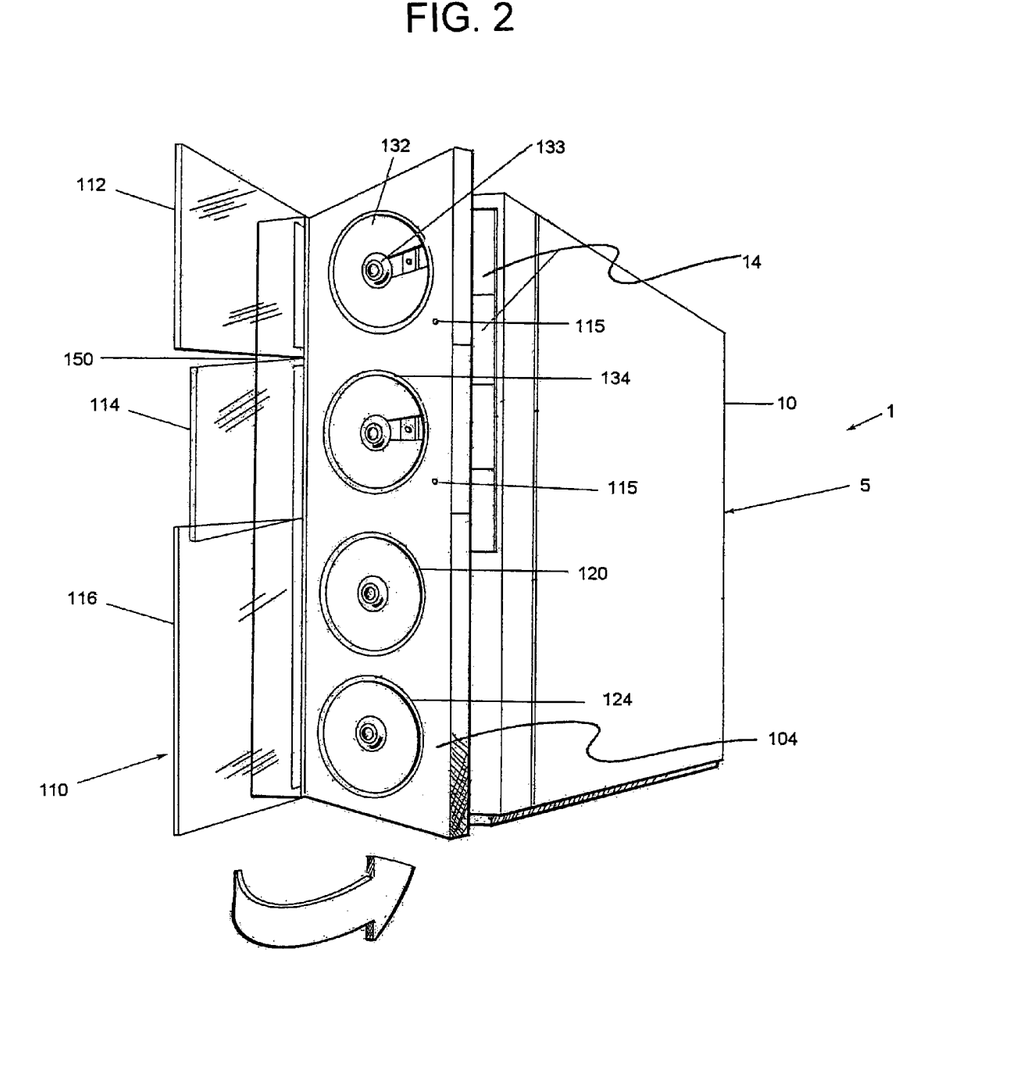
FIG. 2 is a right perspective view of the embodiment shown in FIG. 1.

In one embodiment, shown in FIGS. 1 and 2, the disc drive support surface is on the front face 104 of the panel 100. In this embodiment it is preferred that the panel 100 further include a cover 110 in order to protect the disc drive 130 and a disc 50 retained on the disc drive 130 during operation. Such a cover can, for example, be hingedly connected to the panel 100, or can be reversibly connected to the front face 104 of the panel 100 in other ways known to the art. The cover can also be integral to the disc drive 130 rather than being attached to the panel 100. Preferably, the cover 110 is transparent, so that the identity of a disc 50 retained in the disc drive (when not in operation) can be determined without opening the cover.

Figure 3:
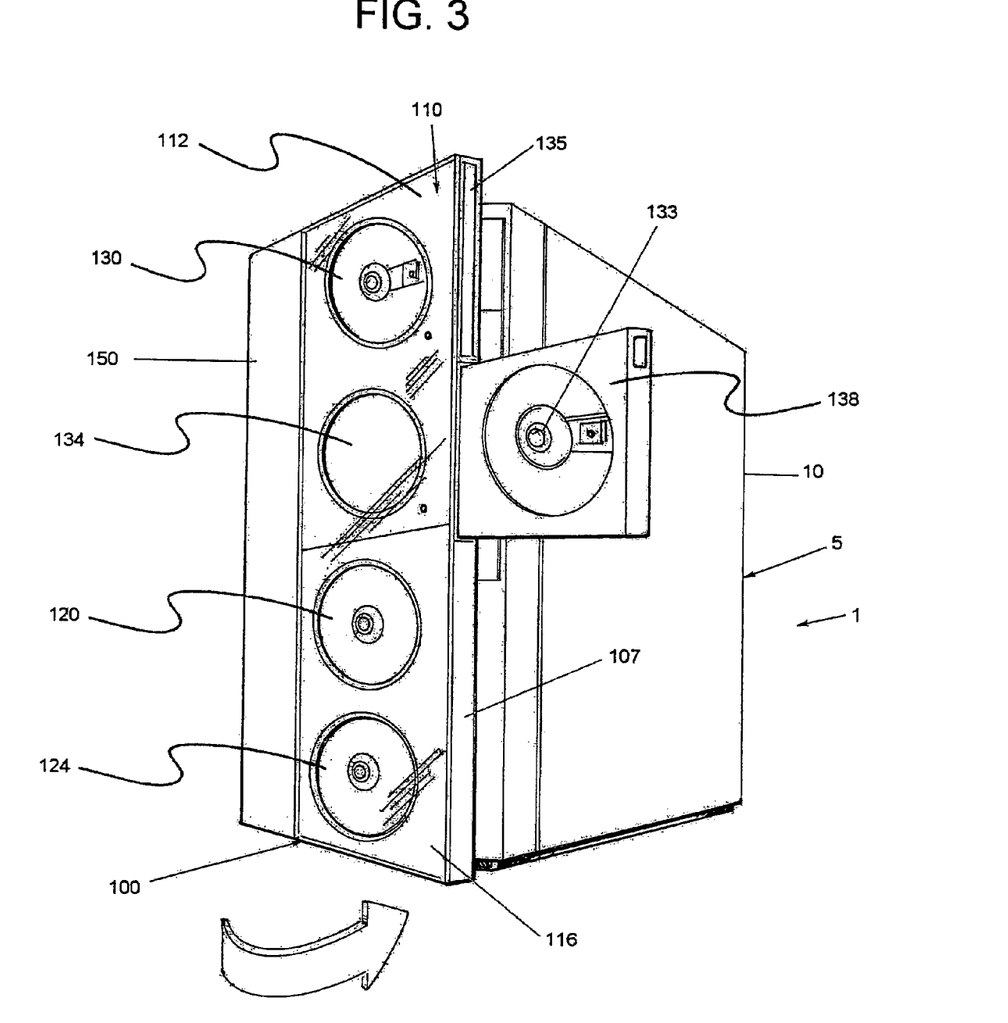
FIG. 3 is a right perspective view of another embodiment of the present invention.
Figure 4:
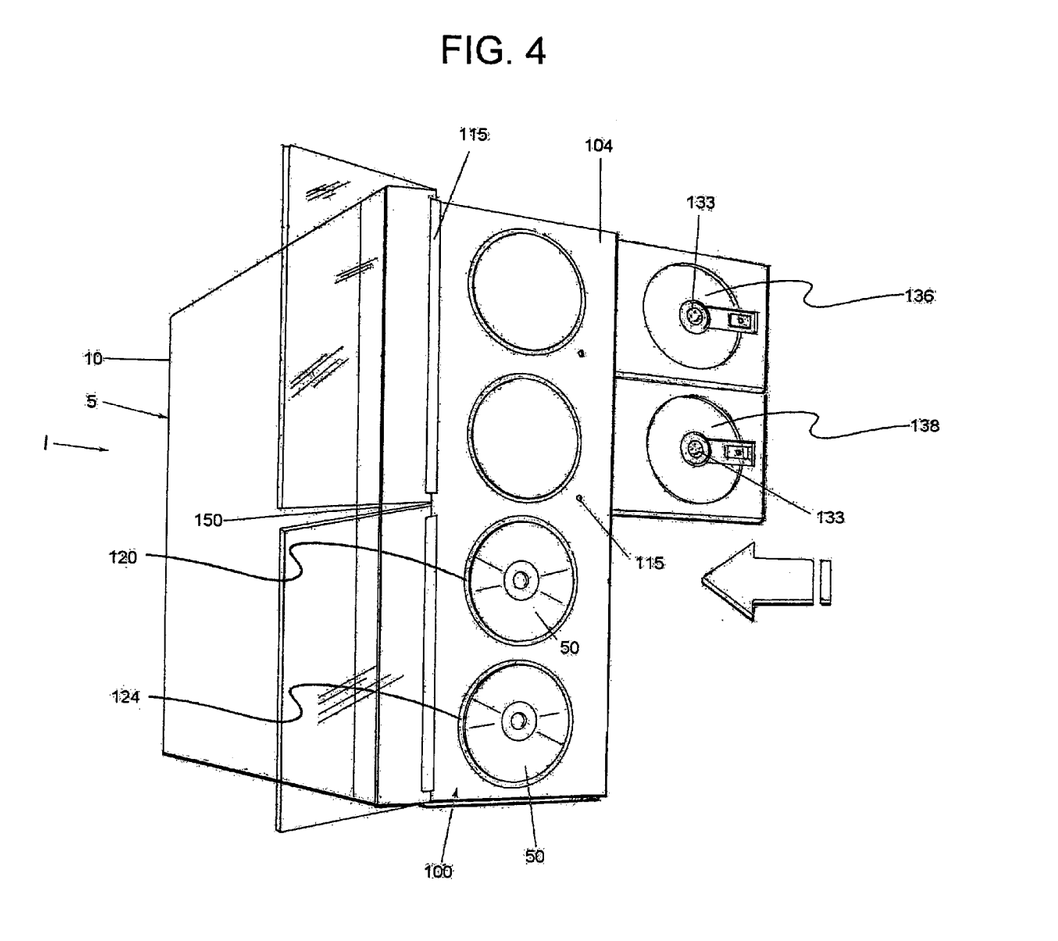
FIG. 4 is a left perspective view of the embodiment shown in FIG. 3

In other embodiments, such as the embodiments shown in FIGS. 3 and 4, the disc drive support surface comprises a tray which extends from a position internal to the disc drive 130. A disc 50 is placed onto the tray once it has been extended, and the tray then retracts into a playback position in the drive. The disc 50 is centered on a turntable in the drive 130, clamped in place, and data is then read from (or written onto) the disc 50 by an optical head. The tray is movable from an open or extended position to a retracted position, e.g., by means of a motor in mechanical communication with the tray via, for example, gears and belts. When the tray is in an extended position, it extends through a slot or opening in the disc drive.

In an alternative embodiment (not shown), a disc can be inserted into a disc drive by placing it into a slot in the drive. A loading mechanism in the disc drive then grasps the disc, pulls it into the drive, and positions it for access by an optical head.

Discs 50 can be removed from a disc drive 130 by engaging an eject switch on the housing of the drive. Alternatively, an eject command can be entered via a keyboard or other device in electrical communication with the computer system (including a wireless device). The mechanism used to load a disc is then operated in the reverse direction in order to eject it. A disc 50 that is directly mounted on the front face 104 of the panel 100 is removed manually.

The disc drives used in the present system can be those adapted to read from and/or write to various storage media. Such media include various storage formats for digital information, including magnetic or optical formats. Magnetic and optical media are generally referred to as magnetic or optical discs. Optical discs can be classified, for example, as read-only (such as conventional CD, DVD, and CD-ROM discs), read-after-write (such a CD-R discs) and rewriteable types (e.g., CD-RW and DVD-RW discs). Rewriteable types include magneto-optical types, phase-change (crystal-amorphous transformation) types, and organic pigment types. Other optical formats can also be used with the present system, such as DVD-RAM discs and 12 centimeter discs (generally provided in a protective cartridge).

One advantage of the panel 100 of the present system, in addition to retaining disc drives 130, is that it can also provide a storage compartment, e.g., for storing one or more optical discs for use with the disc drives 130 retained by the panel 100. A compartment sized to allow the storage of such discs can, for example, include sleeves or slots into which discs can be placed. Such a compartment can be accessed through a door either on the front face 104 or on the side 107 of the panel 100. Alternatively, a disc can be placed or mounted directly onto a holder on the front face 104 of the panel 100 as shown, e.g., in FIGS. 1 and 8. Such a disc holder preferably retains optical discs in a plane parallel to the front face 104 of the panel 100.

PREFERRED EMBODIMENTS

FIGS. 1 and 2 illustrate one embodiment of the present computer system 1. In this embodiment, the panel 100 comprises a housing and includes storage areas 120 and 124 as well as optical disc drives 132 and 134. It will be appreciated that in other embodiments different numbers of disc drives 130 and/or storage areas can be included in the panel 100. FIG. 2 illustrates discs being retained in disc drives 132 and 134 and in disc storage areas 120 and 124. The disc drives 132 and 134 each include a center hub 133 for retaining a disc 50.

The panel 100 further includes a cover 110, which in this embodiment is divided into three different cover panels 112, 114, and 116. Upper and middle cover panels 112 and 114 are hingedly connected to the panel 100 via hinges 115 and 117 and are adapted to cover disc drives 132 and 134, respectively. Cover panel 116 is likewise hingedly connected to the panel 100 and is adapted to cover disc storage areas 120 and 124. The cover 110 is preferably transparent, and thus made from a transparent material such as glass or acrylic. In this way, identifying information on the outer surface of a disc 50 retained in either disc drives 132 and 134 or in disc storage areas 120 and 124 can be viewed when discs are retained in such disc drives or storage areas.

The panel 100 preferably includes indicator lights, such as LED indicators 115. Such indicators can show that the power is on, or provide other information to a user of the computer system 1. In preferred embodiments, the panel 100 further includes one or more door sensors 119. Such sensors detect whether the cover panel for a disc drive, such as cover panel 112 for disc drive 132, is open or closed. This mechanism can be adapted to turn off power to the disc drive when the panel covering such a disc drive 130 is opened.

FIGS. 3 and 4 illustrate an alternative embodiment of the present computer system 1. This embodiment, like that illustrated in FIGS. 1 and 2, includes two disc drives 132, 134 and two storage areas 120 and 124. In this embodiment, however, the disc drives 132 and 134 include disc drive trays 136 and 138, respectively, which are adapted to extend through a side wall 107 of the panel 100. When the tray 136 is in its extended position, it extends through the slot 135. The trays include a center hub 133 for retaining a disc on the tray.

The embodiment of FIGS. 3 and 4 differs from that of FIGS. 1 and 2 in that optical discs 50 are placed directly on the disc drives 132 and 134 illustrated in FIGS. 1 and 2, while discs 50 are applied to a tray extending through the wall 107 of the panel 100 in the embodiment shown in FIGS. 3 and 4. In this embodiment, the upper cover panel 112 can either be hingedly attached to the panel 100, as shown in FIG. 4, or can more preferably be fixedly attached to the panel 100.

As shown in FIG. 5, a hinge 154 preferably helps connects the computer body 5 with the panel 100. In the embodiment shown in FIG. 5, hinge 154 is connected to the panel 100 via an attachment panel 150. The panel 100 can further include a latch that cooperates with a catch or other mechanism in the computer body 5 in order to maintain the panel 100 in a closed position. In some embodiments, the panel 100 can also include a lock to prevent unauthorized access to the portion of the front face 112 of the computer housing 10 covered by the panel 100.

FIGS. 6-10 illustrate a further embodiment of the present computer system 1. In this embodiment, the panel 100 includes at least one removable disc drive 165 which is adapted to be reversibly secured to a docking area 164 provided in the panel 100. In this context, "reversibly secured" refers to a disc drive that can be removed from the panel 100 and returned thereto without damaging the panel 100, for example through the use of mechanical fasteners such as screws 137 (shown in FIG. 6).

Figure 6:
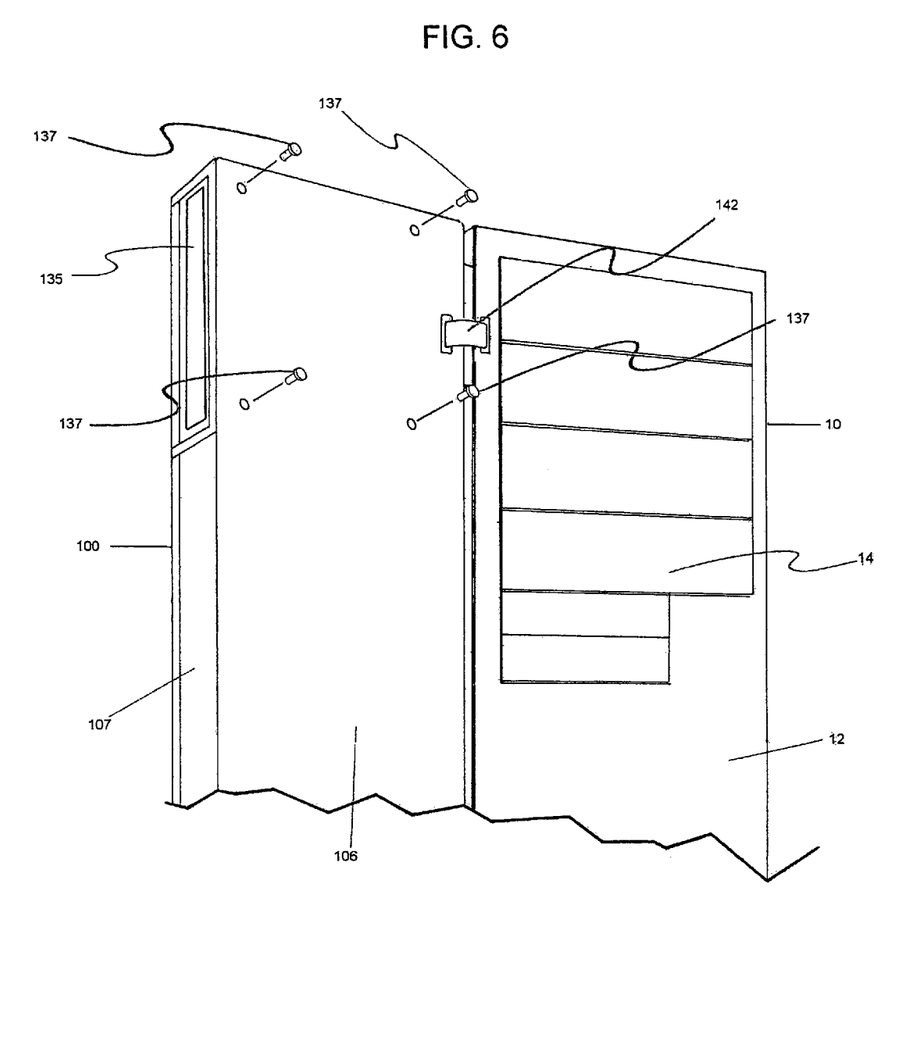
FIG. 6 is a right perspective view of another embodiment of the present invention.

The disc drive 165 further preferably includes a transparent cover 166, which can be hingedly connected to the disc drive 165. Alternatively, the disc drive 165 can include an ejectable disc drive tray (not shown) or other mechanism for inserting an optical disc into the disc drive 165, in which case the cover 166 can be fixed in place. A disc 50 can be inserted into the disc drive 165 as in other embodiments of the present invention. For example, the disc drive 165 can include a tray (not shown) which extends away from the disc drive 165 in order to allow a disc 50 to be placed on it.

Figure 8:
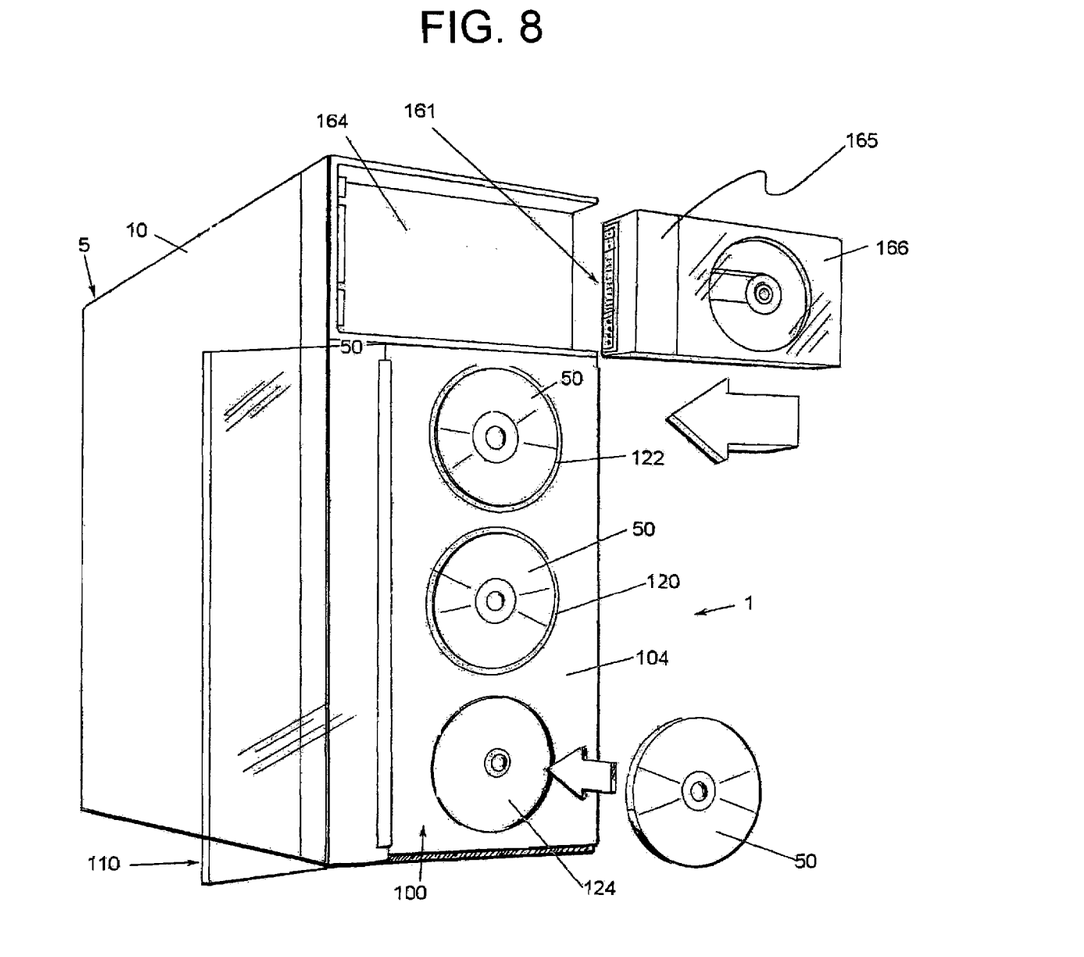
FIG. 8 is a left perspective view of the embodiment of the present invention shown in FIG. 6, showing the insertion of a removable disc drive.
Figure 9:
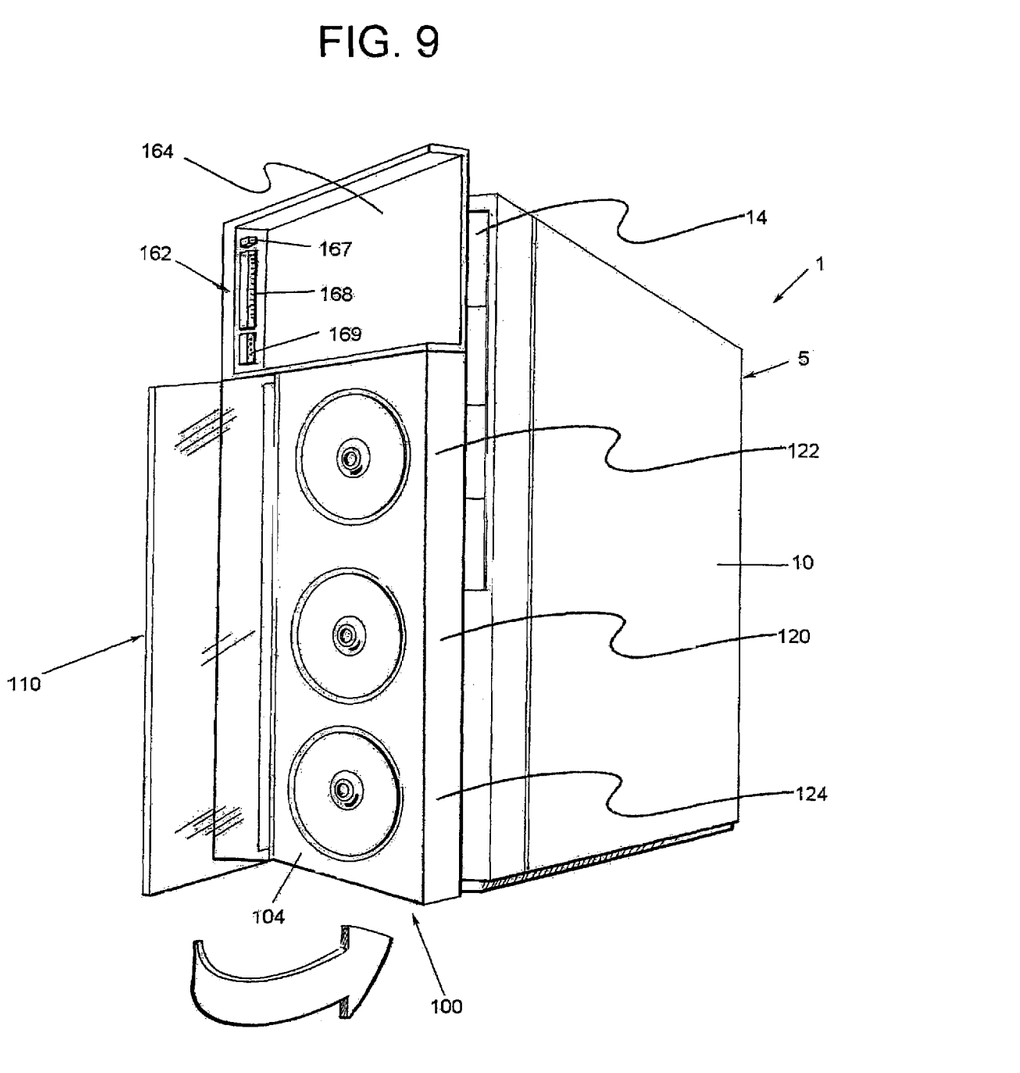
FIG. 9 is a right perspective view of the embodiment shown in FIG. 6, without the removable disc drive.

In the embodiment illustrated in FIGS. 8 and 9, three disc storage areas (120, 122, and 124) are depicted as retaining discs 50. However, this embodiment, like other embodiments of the present computer system 1, can include more storage areas, fewer storage areas, or can omit the storage areas altogether. In addition, storage areas of different configurations can also be included in the disc drive housing 100.

Figure 7:
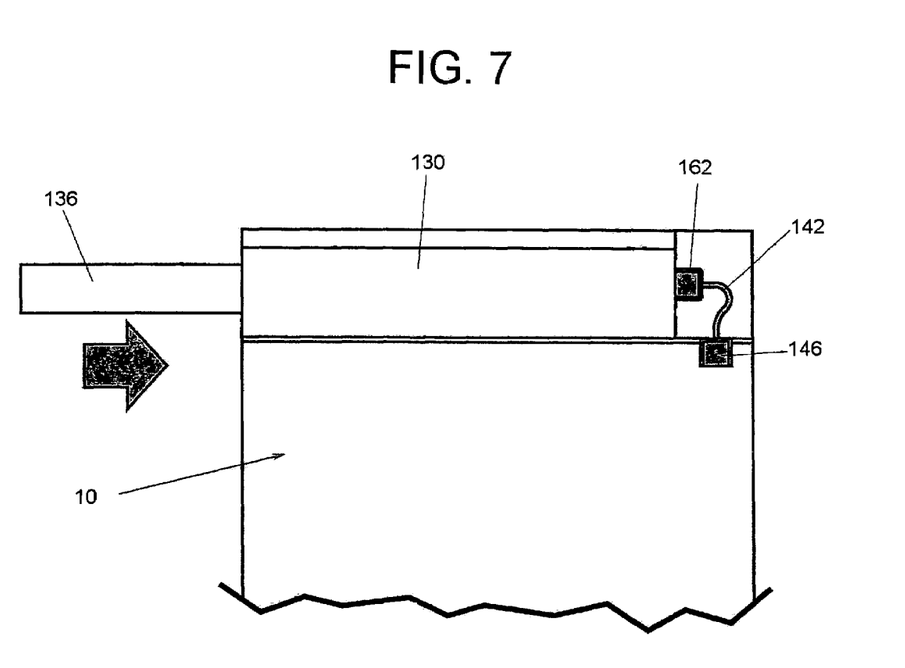
FIG. 7 is a top plan cutaway view illustrating the embodiment of the invention shown in FIG. 6.

The disc drive 165 of this embodiment preferably includes male-to-female connectors 161 for placing the disc drive 165 into electrical communication with the remainder of the computer system 1. In the embodiment illustrated in FIGS. 8 and 9, disc drive 165 includes male connectors 161 which are adapted to connect to a connector interface 162 comprising a female audio connector 167, a female data connector 168, and a female power connector 169. As shown in FIG. 7, the connector interface 162 is electrically connected to other components of the computer system 1 by the ribbon cable 142. Such ribbon cables can include separate wires to carry, e.g., power, audio information, and other data. FIG. 7 further illustrates that the ribbon cable 142 is electrically connected to other wires in the computer housing 10 via a male-to-female-type connector 146.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference to their entirety.

What is claimed is:

1. A panel adapted to be hingedly connected to a desktop computer, the panel having a front face and a rear face, wherein the rear face of the panel is adapted to cover at least a portion of a first face of the computer, the panel further comprising an optical disc drive secured to the panel and a transparent cover for the optical disc drive, wherein the panel is adapted to retain the optical disc drive in electrical communication with the computer.

2. The panel of claim 1, wherein the rear face of the panel is adapted to completely cover the first face of the computer.

3. The panel of claim 1, wherein the optical disc drive is reversibly secured to the panel.

4. The panel of claim 1, further including a disc drive housing for the optical disc drive.

5. The panel of claim 4, wherein the disc drive housing includes an opening for inserting an optical disc into the optical disc drive.

6. The panel of claim 5, wherein the optical disc drive comprises a tray adapted to extend through the opening of the disc drive housing.

7. The panel of claim 1, wherein the optical disc drive retains an optical disc on a support surface on the front face of the panel.

8. A panel adapted to be hingedly connected to a desktop computer, the panel having a front face and a rear face, wherein the rear face of the panel is adapted to cover at least a portion of a first face of the computer, and wherein the panel is further adapted to retain a disc drive in electrical communication with the computer, further including a storage compartment.

9. The panel of claim 8, further including the disc drive, wherein the disc drive is secured to the panel.

10. The panel of claim 8, wherein the rear face of the panel is adapted to completely cover the first face of the computer.

11. A computer comprising:
   (a) a computer housing having a first face for providing access to computer components;
   (b) a panel hingedly connected to the computer and adapted to retain an optical disc drive, the panel having a front face and a rear face, wherein the rear face of the panel is adapted to cover at least a portion of the first face of the computer housing, the panel further comprising a storage compartment adapted to hold optical discs; and
   (c) an optical disc drive secured to the panel and in electrical communication with the computer.

12. The computer of claim 11, wherein the optical disc drive retains an optical disc on a support surface on the front face of the panel.

13. The computer of claim 11, wherein the panel further includes a cover over the optical disc drive.

14. The computer of claim 11, wherein the rear face of the panel is adapted to completely cover the first face of the computer housing.

15. The computer of claim 11, wherein the panel further comprises a lock for securing the panel over the first face of the computer housing.

16. The computer of claim 11, wherein the optical disc drive is reversibly secured to the panel.

17. The computer of claim 11, wherein the panel comprises a housing for the optical disc drive.

18. The computer of claim 17, wherein the housing includes an opening for inserting an optical disc into the disc drive.

19. The computer of claim 18, wherein the optical disc drive comprises a tray that is adapted to extend through the opening of the housing.

20. The computer of claim 11, further comprising a second optical disc drive secured to the panel.

21. A computer comprising:
(a) a computer housing having a first face for providing access to computer components;
(b) a panel hingedly connected to the computer and adapted to retain an optical disc drive, the panel having a front face and a rear face, wherein the rear face of the panel is adapted to cover at least a portion of the first face of the computer housing, the panel further comprising a cover over the optical disc drive, wherein the cover is transparent; and
(c) an optical disc drive secured to the panel and in electrical communication with the computer.

22. The computer of claim 21, wherein the rear face of the panel is adapted to completely cover the first face of the computer housing.

23. A computer comprising:
(a) a computer housing having a first face for providing access to computer components;
(b) a panel hingedly connected to the computer and adapted to retain an optical disc drive, the panel having a front face and a rear face, wherein the rear face of the panel is adapted to cover at least a portion of the first face of the computer housing, the panel further comprising a cover over the optical disc drive, wherein the cover is hingedly connected to the panel; and
(c) an optical disc drive secured to the panel and in electrical communication with the computer.

24. The computer of claim 23, wherein the rear face of the panel is adapted to completely cover the first face of the computer housing.

* * * * *